United States Patent
Dick et al.

(10) Patent No.: US 9,634,801 B2
(45) Date of Patent: *Apr. 25, 2017

(54) USER EQUIPMENT IDENTIFICATION SPECIFIC SCRAMBLING

(75) Inventors: Stephen G. Dick, Nesconset, NY (US); Nader Bolourchi, Larchmont, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 241 days.

This patent is subject to a terminal disclaimer.

(21) Appl. No.: 13/168,809

(22) Filed: Jun. 24, 2011

(65) Prior Publication Data

US 2011/0255475 A1    Oct. 20, 2011

Related U.S. Application Data (63) Continuation of application No. 12/467,694, filed on May 18, 2009, now Pat. No. 7,970,127, which is a
(Continued)

(51) Int. Cl.
*H04K 1/00*      (2006.01)
*H04L 1/00*      (2006.01)
(Continued)

(52) U.S. Cl.
CPC ........... *H04L 1/0066* (2013.01); *H04B 1/707* (2013.01); *H04L 1/0041* (2013.01);
(Continued)

(58) Field of Classification Search
None
See application file for complete search history.

(56) References Cited

U.S. PATENT DOCUMENTS 3,064,080 A    11/1962   Wilton
3,287,697 A    11/1966   Jackel
(Continued)

FOREIGN PATENT DOCUMENTS

CA         2 228 714        1/1998
CA         2280585 A1        2/2000
(Continued)

OTHER PUBLICATIONS

"3rd Generation Partnership Project: Technical Specification Group Radio Access Network; Multiplexing and channel coding (FDD) (Release 5)," 3GPP TS 25.212 v5.1.0-DRAFT, Jun. 2002.
(Continued)

*Primary Examiner* — Brandon Hoffman
(74) *Attorney, Agent, or Firm* — Volpe and Koenig, P.C.

(57) ABSTRACT

A base station for use in a code division multiple access communication system comprises circuitry configured to process a user equipment identification (UE ID) by 1/2 rate convolutionally encoding the UE ID to produce a sequence. The sequence is used by the base station for scrambling a high speed shared control channel (HS-SCCH). The base station is configured to transmit a wireless signal. The wireless signal provides the user equipment with payload data carried on a high speed physical downlink shared channel (HS-PDSCH). The HS-PDSCH is associated with the HS-SCCH.

12 Claims, 2 Drawing Sheets

Related U.S. Application Data continuation of application No. 11/796,534, filed on Apr. 24, 2007, now Pat. No. 7,536,013, which is a continuation of application No. 10/779,431, filed on Feb. 13, 2004, now Pat. No. 7,349,540, which is a continuation of application No. 10/187,640, filed on Jul. 1, 2002, now Pat. No. 6,973,579.

(60) Provisional application No. 60/378,170, filed on May 13, 2002, provisional application No. 60/378,509, filed on May 7, 2002.

(51) Int. Cl.
  *H04B 1/707* (2011.01)
  *H04L 1/08* (2006.01)
  *H04L 1/18* (2006.01)
  *H04W 88/08* (2009.01)

(52) U.S. Cl.
  CPC .......... *H04L 1/0057* (2013.01); *H04L 1/0059* (2013.01); *H04L 1/0068* (2013.01); *H04L 1/0072* (2013.01); *H04L 1/08* (2013.01); *H04L 1/1812* (2013.01); *H04W 88/08* (2013.01)

(56) References Cited

U.S. PATENT DOCUMENTS

| | | |
|---|---|---|
| 3,569,956 A | 3/1971 | Duffy |
| 3,735,351 A | 5/1973 | Macheel |
| 4,208,739 A | 6/1980 | Lu et al. |
| 4,639,548 A | 1/1987 | Oshima et al. |
| 4,823,346 A | 4/1989 | Kobayahshi et al. |
| 4,910,736 A | 3/1990 | Tanaka et al. |
| 4,980,897 A | 12/1990 | Decker et al. |
| 5,003,529 A | 3/1991 | Ikeda |
| 5,003,539 A | 3/1991 | Takemoto et al. |
| 5,091,942 A | 2/1992 | Dent |
| 5,134,635 A | 7/1992 | Hong et al. |
| 5,142,539 A | 8/1992 | Dahlin et al. |
| 5,159,610 A | 10/1992 | Eyuboglu et al. |
| 5,161,244 A | 11/1992 | Maurer |
| 5,168,509 A | 12/1992 | Nakamura et al. |
| 5,181,209 A | 1/1993 | Hagenauer et al. |
| 5,230,003 A | 7/1993 | Dent et al. |
| 5,233,629 A | 8/1993 | Paik et al. |
| 5,233,630 A | 8/1993 | Wolf |
| 5,307,377 A | 4/1994 | Chouly et al. |
| 5,321,725 A | 6/1994 | Paik et al. |
| 5,353,352 A | 10/1994 | Dent et al. |
| 5,363,408 A | 11/1994 | Paik et al. |
| 5,365,588 A | 11/1994 | Bianco et al. |
| 5,408,499 A | 4/1995 | Sasaki |
| 5,408,502 A | 4/1995 | How |
| 5,428,631 A | 6/1995 | Zehavi |
| 5,438,590 A | 8/1995 | Tzukerman et al. |
| 5,448,592 A | 9/1995 | Williams et al. |
| 5,493,584 A | 2/1996 | Emeott |
| 5,517,511 A | 5/1996 | Hardwick et al. |
| 5,588,058 A | 12/1996 | Le Berre |
| 5,671,218 A | 9/1997 | I et al. |
| 5,765,126 A | 6/1998 | Tsutsui et al. |
| 5,799,154 A | 8/1998 | Kuriyan |
| 5,809,082 A | 9/1998 | Xia |
| 5,815,507 A | 9/1998 | Vinggaard et al. |
| 5,870,414 A | 2/1999 | Chaib et al. |
| 5,881,071 A | 3/1999 | Kuznetsov et al. |
| 5,917,852 A | 6/1999 | Butterfield et al. |
| 5,995,515 A | 11/1999 | Suzuki |
| 6,005,852 A | 12/1999 | Kokko et al. |
| 6,012,160 A | 1/2000 | Dent |
| 6,014,567 A | 1/2000 | Budka |
| 6,035,040 A | 3/2000 | Mann et al. |
| 6,072,778 A | 6/2000 | Labedz et al. |
| 6,081,597 A | 6/2000 | Hoffstein et al. |
| 6,167,552 A | 12/2000 | Gagnon et al. |
| 6,170,076 B1 | 1/2001 | Kim |
| 6,185,265 B1 | 2/2001 | Campanella |
| 6,188,717 B1 | 2/2001 | Kaiser et al. |
| 6,201,811 B1 | 3/2001 | Larsson et al. |
| 6,208,615 B1 | 3/2001 | Faruque et al. |
| 6,253,193 B1 | 6/2001 | Ginter et al. |
| 6,275,538 B1 | 8/2001 | Ramesh et al. |
| 6,289,499 B1 | 9/2001 | Rieger et al. |
| 6,298,137 B1 | 10/2001 | Hoffstein et al. |
| 6,332,006 B1 | 12/2001 | Rydbeck et al. |
| 6,377,611 B1 | 4/2002 | Hwang |
| 6,385,183 B1 | 5/2002 | Takeo |
| 6,389,138 B1 | 5/2002 | Li et al. |
| 6,400,703 B1 | 6/2002 | Park et al. |
| 6,404,802 B1 | 6/2002 | Kang et al. |
| 6,430,722 B1 | 8/2002 | Eroz et al. |
| 6,484,285 B1 | 11/2002 | Dent |
| 6,493,331 B1 | 12/2002 | Walton et al. |
| 6,539,047 B1 | 3/2003 | Moon |
| 6,549,542 B1 | 4/2003 | Dong et al. |
| 6,549,779 B1 | 4/2003 | Miller et al. |
| 6,553,535 B1 | 4/2003 | Asada et al. |
| 6,567,461 B1 | 5/2003 | Moon et al. |
| 6,574,466 B2 | 6/2003 | Papini et al. |
| 6,574,774 B1 | 6/2003 | Vasiliev |
| 6,631,124 B1 | 10/2003 | Koorapaty et al. |
| 6,717,927 B2 | 4/2004 | Chao et al. |
| 6,731,618 B1 | 5/2004 | Chung et al. |
| 6,754,824 B1 | 6/2004 | Persson et al. |
| 6,802,033 B1 | 10/2004 | Bertin et al. |
| 6,823,488 B1 | 11/2004 | Heegard et al. |
| 6,829,355 B2 | 12/2004 | Lilly |
| 6,871,313 B2 | 3/2005 | Gopalakrishnan |
| 6,873,647 B1 | 3/2005 | Tiedemann, Jr. et al. |
| 6,882,636 B1 | 4/2005 | Kim et al. |
| 6,912,284 B1 | 6/2005 | Palmatier |
| 6,915,473 B2 | 7/2005 | Bolourchi et al. |
| 6,917,603 B2 | 7/2005 | Strawczynski et al. |
| 6,944,206 B1 | 9/2005 | Dent |
| 6,956,948 B1 | 10/2005 | Hwang et al. |
| 6,961,387 B2 | 11/2005 | Kim et al. |
| 6,963,540 B2 | 11/2005 | Choi et al. |
| 6,970,563 B1 | 11/2005 | Risling |
| 6,973,579 B2 | 12/2005 | Dick et al. |
| 6,983,412 B2 | 1/2006 | Fukumasa |
| 7,020,126 B2 | 3/2006 | Choi et al. |
| 7,027,521 B2 | 4/2006 | Gueguen |
| 7,039,852 B2 | 5/2006 | Dent |
| 7,050,417 B2 | 5/2006 | Kim |
| 7,058,132 B1 | 6/2006 | Sebire et al. |
| 7,061,915 B2 | 6/2006 | Seidel et al. |
| 7,120,435 B2 | 10/2006 | Usher et al. |
| 7,133,845 B1 | 11/2006 | Ginter et al. |
| 7,139,243 B2 | 11/2006 | Okumura |
| 7,162,675 B2 | 1/2007 | Das et al. |
| 7,173,919 B1 | 2/2007 | Dabak |
| 7,209,515 B2 | 4/2007 | Kilfolyle et al. |
| 7,227,888 B2 | 6/2007 | Lemieux |
| 7,230,941 B2 | 6/2007 | Odenwalder et al. |
| 7,308,097 B2 | 12/2007 | Hoffstein et al. |
| 7,349,540 B2 | 3/2008 | Dick et al. |
| 7,440,485 B2 | 10/2008 | Kwon et al. |
| 7,471,660 B2 | 12/2008 | Dottling et al. |
| 7,508,804 B2 | 3/2009 | Das et al. |
| 7,886,142 B2 | 2/2011 | Kwon et al. |
| 7,913,088 B2 | 3/2011 | Hoffstein et al. |
| 8,121,292 B2 | 2/2012 | Jou et al. |
| 2002/0009129 A1 | 1/2002 | Choi et al. |
| 2002/0018565 A1 | 2/2002 | Luttrell et al. |
| 2002/0041578 A1 | 4/2002 | Kim et al. |
| 2002/0044542 A1 | 4/2002 | Kim et al. |
| 2002/0075838 A1 | 6/2002 | Choi et al. |
| 2002/0075964 A1 | 6/2002 | Okumura |
| 2002/0114268 A1 | 8/2002 | Kim et al. |
| 2002/0138721 A1 | 9/2002 | Kwon et al. |
| 2002/0177436 A1 | 11/2002 | Lemieux |
| 2003/0005388 A1 | 1/2003 | Fukumasa |
| 2003/0048800 A1 | 3/2003 | Kilfoyle et al. |

(56) References Cited

U.S. PATENT DOCUMENTS

| | | |
|---|---|---|
| 2003/0074476 A1 | 4/2003 | Kim et al. |
| 2003/0108013 A1 | 6/2003 | Hwang et al. |
| 2003/0161471 A1 | 8/2003 | Jou et al. |
| 2003/0189918 A1 | 10/2003 | Das et al. |
| 2005/0063347 A1 | 3/2005 | Sarkkinen et al. |

FOREIGN PATENT DOCUMENTS

| | | |
|---|---|---|
| CN | 1335684 A | 2/2002 |
| EP | 0682327 A2 | 11/1995 |
| EP | 0910190 A2 | 4/1999 |
| EP | 1322042 B1 | 4/2009 |
| GB | 2 259 226 | 3/1993 |
| GB | 2344731 | 6/2000 |
| JP | 02-179048 A2 | 7/1990 |
| JP | 02291737 | 12/1990 |
| JP | 05-160861 A2 | 6/1993 |
| JP | 08-130535 A2 | 5/1996 |
| JP | 11-252064 A2 | 9/1999 |
| JP | 2001-326968 | 11/2001 |
| KR | 2001 0063271 | 7/2001 |
| KR | 20010065131 A | 7/2001 |
| KR | 2001-0084779 A | 9/2001 |
| KR | 20030065674 A | 8/2003 |
| KR | 2003 0080306 | 10/2003 |
| WO | 8706368 A1 | 10/1987 |
| WO | 9202087 A1 | 2/1992 |
| WO | 9535641 A1 | 12/1995 |
| WO | 9702665 A2 | 1/1997 |
| WO | 97/16899 | 5/1997 |
| WO | 98/45970 | 10/1998 |
| WO | 99/07076 | 2/1999 |
| WO | 99/18689 | 4/1999 |
| WO | 99/33271 | 7/1999 |
| WO | 0030291 A1 | 5/2000 |
| WO | 00/41316 | 7/2000 |
| WO | 01/06662 | 1/2001 |
| WO | 01/18055 | 3/2001 |
| WO | 01/50675 | 7/2001 |
| WO | 02/05445 | 1/2002 |
| WO | 0209019 A2 | 1/2002 |
| WO | 03/065618 | 8/2003 |

OTHER PUBLICATIONS

"3rd Generation Partnership Project: Technical Specification Group Radio Access Network; Multiplexing and Channel Coding (FDD) (Release 5)," 3GPP TS 25.212 v5. 0.0 (Mar. 2002).
"3rd Generation Partnership Project: Technical Specification Group Radio Access Network; High Speed Downlink Packet Access: Physical Layer Aspects (Release 5)," 3GPP TR 25.858 V5.0.0 (Mar. 2002).
"3$^{rd}$ Generation Partnership Project; Technical Specification Group Radio Access Network, Multiplexing and Channel Coding (FDD) (Release 5)", 3GPP TS 25.212 V5.0.0, Mar. 2002.
"3rd Generation Partnership Project; Technical Specification Group Radio Access Network; High Speed Downlink Packet Access (HDSPA); Overall Description; Stage 2 (Release 5)," 3GPP TS 25.308 v5.2.0 (Mar. 2002) Technical Specification.
"3rd Generation Partnership Project; Technical Specification Group Radio Access Network; High Speed Downlink Packet Access; Physical Layer Aspects (Release 5)," 3GPP TR 25.858 v1.0.0 (Dec. 2001) Technical Report.
"3rd Generation Partnership Project; Technical Specification Group Radio Access Network; Multiplexing and channel coding (TDD) (Release 4)," 3GPP TS 25.222 v4.2.0 (Dec. 2001) Technical Specification.
"3rd Generation Partnership Project; Technical Specification Group Radio Access Network; Multiplexing and channel coding (TDD) (Release 5)," 3GPP TS 25.222 v5.2.0 (Sep. 2002) Technical Specification.

"Draft Minutes of WG1 #21 Meeting," TSG-RAN Working Group 1 Meeting No. 22, TSGR1-01-0990, New York, New York, Oct. 23-26.
"Draft Minutes of WG1 #22 Meeting," TSG-RAN Working Group 1 Meeting No. 23, TSGRI-01-1354, Espoo, Finland, Jan. 8-11.
"Draft Minutes of WG1 #25 Meeting," TSG-RAN Working Group 1 Meeting No. 25, TSGRI-02-0688, Paris, France, Apr. 9, 2002.
"Revised Minutes of TSG RAN WG1 #23 Meeting," TSG-RAN Working Group 1 Meeting No. 24, TSGR1-02-0356, Orlando, Florida, Feb. 18-22.
"Revised Minutes of TSG RAN WG1 #25 Meeting," TSG-RAN Working Group 1 Meeting No. 25, TSGR1-02-0791, No Date.
"Revised Minutes of TSG-RAN WG1 #24," TSG-RAN Working Group 1 Meeting No. 25, TSGR1-02-0575, Paris, France, Apr. 9-12.
3GPP TR 25.858, "Technical Specification Group Radio Access Network; High Speed Downlink Packet Access; Physical Layer Aspects," 3$^{rd}$ Generation Partnership Project; V5.0.0, 3GPP, (Release 5) Mar. 2002, pp. 1-31.
3GPP, 3$^{rd}$ Generation Partnership Project (3GPP); Technical Specification Group Radio Access Network Multiplexing and channel coding (FDD), 3G TS 25.212, Version 3.0.0 (Oct. 1999).
Chen, W. et al. "A novel code assignment scheme for W-CDMA systems", Vehicular Technology Conference, 2001. VTC 2001 Fall. IEEE VTS 54$^{th}$.
Cheng, R. et al. "OVSF Code Channel Assignment for IMT-2000", Vehicular Technology Conference Proceedings, 2000. VTC 2000-Spring Tokyo, 2000.
CWTS/Huawei Technologies Co., Ltd., "Discussion About SCCH-HS channel coding and necessity of transmission of HI", R1-02-0114, (Jan. 2002).
Draft minutes of TSG RAN WG1 #24 meeting, TSG-RAN Working Group 1 meeting No. 25, Apr. 9-12, Paris, France, TSGR1-02-0520.
Ericsson, "Shared control Channel, detailed structure (revision of R1-01-1115)", R1-01-1051, 3GPP TSG-RAN1 #22 Nov. 19-23, 2001, Cheju, Korea.
ETSI TS 125 212 v5.0.0 (Mar. 2002) Technical Specification, "Universal Mobile Telecommunications System (UMTS); Multiplexing and Channel Coding (FDD) (3GPP TS 25.212 version 5.0.0 Release 5)"(European Telecommunication Standards Institute, 2002).
Expert Report of Dr. Apostolos K. Kakaes Regarding Invalidity of U.S. Pat. No. 6,973,579, In the Matter of Certain 3G Wideband Code Division Multiple Access (WCDMA) Handsets and Components Thereof, (Oct. 17, 2007).
Expert Report of Dr. Apostolos K. Kakaes Regarding Invalidity of U.S. Pat. No. 6,973,579, (Feb. 1, 2008).
Gitlin, Richard D. et al., Data Communication Principles (1992).
GSM Digital cellular telecommunications system (Phase 2+); Channel coding (GSM 05.03), V5.0.0, Mar. 1996.
InterDigital Comm. Corp., "16 bit ID UE Based UE Specific Masking for HS-SCCH: Updated for consistency with new Rate matching for HS-SCCH," 3GPP TSG RAN WG1#27, R1-02-0941, Oulu, Finland, Jul. 2-5, 2002.
InterDigital Comm. Corp., "16 bit UE ID Based UE Specific Masking for HS-SCCH," Discussion and Decision, 3GPP TSG RAN WG1#26, Kyung-Ju, Korea, May 13-17, 2002.
InterDigital Comm. Corp., "16 bit UE ID Based UE Specific Masking for HS-SCCH: Updated for consistency with new Rate matching for HS-SCCH," Discussion and Decision, 3GPP TSG RAN WG1#27, Olou, Finland, Jul. 2-5, 2002.
InterDigital Comm. Corp., "16 bit UE ID Based UE Specific Masking for HS-SCCH," 3GPP TSG RAN WG1#26, R1-02-0715, Kyung-Ju, Korea, May 13-17, 2002.
InterDigital Comm. Corp., "Correction to UE specific matching for HS-SCCH part 1," 3GPP TSG RAN WG1#27, R1-02-0941, Oulu, Finland, Jul. 2-5, 2002.
InterDigital Comm. Corp., "Discussion on UE Specific Masking for HS-SCCH," 3GPP TSG RAN WG1#26, R1-02-0716, Gyeongju, Korea, May 13-17, 2002.
InterDigital Comm. Corp., "UE Specific Masking for HS-SCCH part 1," 3GPP TSG RAN WG1#26, R1-02-0821, Gyeongju, Korea, May 13-17, 2002.

(56) References Cited

OTHER PUBLICATIONS

InterDigital Comm. Corp., "UE Specific Masking for HS-SCCH part 1," 3GPP TSG RAN WG1#26, R1-02-0830, Gyeongju, Korea, May 13-17, 2002.
InterDigital Comm. Corp., "UE Specific Masking for HS-SCCH part 1," 3GPP TSG RAN WG1#26, R1-02-0843, Gyeongju, Korea, May 13-17, 2002.
InterDigital Comm. Corp., "UE Specific Masking for HS-SCCH part 1," 3GPP TSG RAN WG1#26, R1-02-0850, Gyeongju, Korea, May 13-17, 2002.
InterDigital Comm. Corp., "UE Specific Masking for HS-SCCH part 1," 3GPP TSG RAN WG1#26, R1-02-0858, Gyeongju, Korea, May 13-17, 2002.
InterDigital Comm. Corp., "UE Specific Masking for HS-SCCH part 1," 3GPP TSG RAN WG1#26, R1-02-0859, Gyeongju, Korea, May 13-17, 2002.
InterDigital Comm. Corp., "UE Specific Masking for HS-SCCH, part 1" 3GPP TSG RAN WG1#26, R1-02-0717, Gyeongju, Korea, May 13-17, 2002.
InterDigital Comm. Corp., "HS-SCCH Signaling for 3.84 Mcps TDD," 3GPP TSG RAN WG1#23, R1-01-0224 Orlando, Florida, Feb. 18-21, 2002.
InterDigital Comm. Corp., "HS-SCCH Signaling for FDD HSDPA," 3GPP TSG RAN WG1#23, R1-01-0226 Orlando, Florida, Feb. 18-21, 2002.
InterDigital Communication Corporation, "Implicit UE Identification for HSDPA Downlink Signaling," TSG-RAN Woeking Group 1 #22, R1-01-0810, Torino, Italy, Aug. 27-31, 2001.
InterDigital Communication Corporation, "Simplified Illustration of the Performance Benefit of US Dependent CRC," TSG-RAN Working Group 1 #21, R1-01-0972, Torino, Italy, Aug. 27-31, 2001.
LG Electronics, "On the Criterion for UE Specific Scrambling Code", TSGR1#26-02-0771, 3GPP TSG-RAN WG1 Meeting #26, Gyeongju, Korea, May 13-17, 2002.
LG Electronics, "On User-Specific Scrambling Code for the Part 1 of HS-SCCH", Tdoc R1-02-0542, TSG-RAN WG1 Meeting #25, Apr. 9-12, 2002.
LG Electronics, "UE-Specific Scrambling Code (USSC) for HS-SCCH: USSC based on a scrambling code with time-varying property", Tdoc R1-02-0541, TSG-RAN WG1 Meeting #26, Gyeongju, Korea, May 13-16, 2002.
LG Electronics, "User-Specific Masking Codes for HS-SCCH", Tdoc R1-02-0543, 3GPP TSG-RAN WG1 Meeting #25, Paris, France, Apr. 9-12, 2002.
Lin et al., "Error Control Coding: Fundamentals and Applications", Prentice Hall Inc., (Englewood Cliffs, 1983).
Lucent Technologies, "Comparison of Detection Schemes for the HS-SCCH", 3GPP TSG-RAN WG1#25, R1-02-0699, Gyeongju, Korea, May 13-16, 2002.
Lucent Technologies, "Comparison of Schemes for UE Specific CRC," 3GPP TSG-RAN WG1#23, R1-01-0076, Espoo, Finland, Jan. 8-11, 2002.
Lucent Technologies, "False Alarm Performance of various UE ID Coding, Scrambling and CRC schemes", 3GPP TSG-RAN WG1#26, R1-02-0723, Gyeongju, Korea, May 13-16, 2002.
Lucent Technologies, "Further Results on SCCH Detection with Parity Bits", R1-02-0903, 3GPP TSG-RAN WG1#27, Oulu, Finland, Jul. 2-4, 2002.
Lucent Technologies, "Further Results on SCCH Detection with Parity Bits", R1-02-0903, 3GPP TSG-RAN WG1#27, Oulu, Finland, Jul. 2-5, 2002.
Lucent Technologies, "Performance of the HS-SCCH", 3GPP TSG-RAN WG1#25, R1-02-0649, Paris France, Apr. 9-12, 2002.
Lucent Technologies, "Performance of the HS-SCCH," 3GPP TSG-RAN WG1#25, R1-02-0529, Paris, France, Apr. 9-12, 2002.
Lucent Technologies, "Pre-coding of UE ID before Modulo 2 addition with CRC," 3GPP TSG-RAN WG1#25, Paris, France, Apr. 2002, R1-02-0555.
Lucent Technologies, "UE procedures (HS-SCCH) to support HSDPA enhancements", R1-02-0904, 3GPP TSG-RAN WG1#27, Oulu, Finland, Jul. 2-4, 2002.
Lucent Technologies, "UE procedures (HS-SCCH) to support HSDPA enhancements", R1-02-0904, 3GPP TSG-RAN WG1#27, Oulu, Finland, Jul. 2-5, 2002.
Lucent Technologies, "Way forward on HS-SCCH coding," 3GPP TSG-RAN WG1#25, Paris, France, Apr. 2002, R1-02-0553, pp. 1-6.
Lucent Technologies, "Basis for Comparing HS-SCCH Coding Schemes", R1-02-0071, 3GPP TSG-RAN WG1#23, Korpilampi, Finland, Jan. 8-11, 2002.
Lucent Technologies, "Coding for the Shared control channel (HS-SCCH)", R1-01-1061, 3GPP TSG-RAN WG1#22, JeJu, Korea, Nov. 19-23, 2001.
Lucent Technologies,"Comparison of Schemes for UE Specific CRC," 3GPP TSG-RAN WG1 #24, R-02-0416, Orlando, Florida, Feb. 18-22, 2002.
Minn, T. et al. "Dynamic Assignment of Orthogonal Variable-Spreading-Factor Codes in W-CDMA", IEEE Journal on selected Areas in Communications, vol. 18, No. 8, Aug. 2000.
Motorola, "Performance of the HS-SCCH with different code rates", R1-02-0718, TSG RAN WG1 Meeting #26, Gyeongju, Korea, May 13-16, 2002.
Motorola, "Performance of the HS-SCCH," TSG-RAN Working Group 1 #24, Tdoc R1-02-0610, Paris, France, Apr. 8-12, 2002.
Motorola, "Text Proposal for HS-DOC," TSG-RAN Working Group 1 #24, Tdoc R1-02-0490, Orlando, Florida, Feb. 18-22, 2002.
Motorola, "Way Forward on HS-SCCH," TSG RAN WG1 Meeting #24, R1-02-0463, Orlando, Florida, Feb 18-22, 2002.
Motorola, "Comments on the Requirement for UE ID when HS-DSCH Indicator (HI) bit is present for High Speed Downlink Packet Access (HSDPA) Downlink Signaling", R1-01-0758, TSG-RAN Working Group 1 #21, Korpilampi, Finland, Jun. 26-28, 2001.
Motorola, "Performance of SCCH-HS with various coding options", R1-02-0039, TSG-RAN Working Group 1#23, Espoo, Finland, Jan. 8-11, 2001.
Motorola, "Sizing of the HSDPA control channels", R1-02-1210, TSG-RAN Working Group 1#23, JeJu, Korea, Nov. 19-23, 2001.
Motorola, TSG RAN WG1 Meeting #24, "Performance of the HS-SCCH", http://www.3gpp.org/ftp/TSG_RAN/WG1_RL1/TSGR1_25/Docs/Zips/R1-02-0610.zip, Apr. 2002.
NEC, "Coding for HS-SCCH", R-1-02-0964, 3GPP TSG-RAN WG1 Meeting #27, Oulu, Finland, Jul. 2-5, 2002.
NEC, "Coding for HS-SCCH", R-1-02-1121, 3GPP TSG-RAN WG1 Meeting #28, Seattle, Washington, Aug. 19-22, 2002.
Nokia, "Channel coding and error detection for HS-SCCH," TSG-RAN WG1 #23, 3GPP, Jan. 2002, R1-02-0016.
Panasonic, "Removal of code mapping description over HS-SCCH", Tdoc R1(02)0774, 3GPP TSG-RAN WG1 Meeting #25, Paris France, Apr. 9-12, 2002.
Public Version of Respondents Samsung Electronics America, Inc.'s and Samsung Telecommunications America LLC's Response to the Complaint and Notice of Investigation, In the Matter of Certain 3G Wideband Code Division Multiple Access (WCDMA) Handsets And Components Thereof, Investigation No. 337-TA-601, May 31, 2007.
Qualcomm, "CCH-HS—Summary", R1-02-0157, 3GPP TSG-RAN1 #23, Jan. 8-11, 2002, Espoo, Finland.
Qualcomm, "CCH-HS structure, coding & timing", 3GPP TSG-RAN1 #23, R1-02-0156, Jan. 8-11, 2002, Espoo, Finland.
Qualcomm, "DL HSDPA control structure", R1-01-1264, TSG-RAN WG 1 #22, Jeju, Korea, Nov. 19-23, 2001.
Rebuttal Expert Report of Dr. Apostolos K. Kakaes Regarding Non-Infringement of U.S. Pat. No. 6,973,579, (Feb. 21, 2008).
Responsive Supplemental Expert Report of Dr. Apostolos K. Kakaes Regarding Invalidity of U.S. Pat. No. 6,973,579, (Jun. 13, 2008).
Revised minutes of RAN WG1 Rel-5 Ad Hoc meeting, TSG-RAN Working Group 1 meeting No. 21, TSGR1-01-0885, Turin, Italy, Aug. 27-31.
Revised minutes of TSG RAN WG1 #24 meeting, TSG-RAN Working Group 1 meeting No. 25, TSGR1-02-0628, Paris, France, Apr. 9-12.

(56) References Cited

OTHER PUBLICATIONS

Revised minutes of TSG RAN WG1 #26 meeting, TSG RAN Working Group 1, Meeting No. 27, TSGR1-02-0927, Jul. 2-5, Oulu, Finland.
Revised minutes of TSG-RAN Working Group 1 meeting No. 28, TSG RAN Working Group 1 meeting No. 28, Aug. 19-22, Seattle, WA, USA, TSGR1-02-1022.
Samsung, "An efficient signaling on SCCH-HS and channel coding of SCCH-HS", TSG-RAN Working Group 1 Meeting #23, R1-02-0051, Espoo, Finland, Jan. 8-11, 2002.
Samsung, "Position of New Data Indicator", RAN WG1 meeting #22, Jeju, Korea, Nov. 19-23, 2001, R1-01-1175.
Siemens AG, "Simplification of HS-SCCH part1 rate matching", 3GPP TSG-RAN WG 1 Meeting #27, R1-02-0934, Oulu, Finland, Jul. 2-5, 2002.
Siemens, "Coding and Rate Matching for HS-SCCH", TSG RAN WG1 Meeting #25, Tdoc R1-02-0604, Paris, France, Apr. 9-12, 2002.
Siemens, "Improved HS-SCCH Detection Performance", TSG-RAN WG1 Meeting #25, Tdoc R1-02-0608, Paris France, Apr. 9-12, 2002.
Siemens, "Improved UE Specific CRC Generation," 3GPP TSG-RAN WG1#25, Tdoc R1-02-0493, Paris, France, Feb. 1-12, 2002.
Siemens, "Rate Matching and Channel Coding for HS-SCCH", 3GPP TSG-RAN1 Meeting #25 R1-02-0605, Paris France, Apr. 9-12, 2002.
Siemens, "Revision of UE Specific Masking for HS-SCCH", 3GPP TSG-RAN WG1 Meeting #28, Tdoc 0783, Gyeongju, Korea, May 13-16, 2002.
Siemens, "Revisions of UE Specific Masking for HS-SCCH", 3GPP TSG-RAN WG1 Meeting #28, Tdoc R1-02-0934, Gyeongju, Korea, May 13-16, 2002.
Siemens, "Simplified UE-ID Masking of HS-SCCH, Part 1," Discussion and Decision, Tdoc R1-02-0914, TSG-RAN Working Group 1 #27, Oulu, Finland, Jul. 2-5, 2002.
Siemens, "UE Specific Bit Scrambling for TDD HS-SCCH", 3GPP TSG RAN WG1 Meeting #25, 3GPP TSG-RAN WG1 #25, Paris, France, Feb. 9-12, 2002, R1-02-0400.
Siemens, "UE Specific Bit Scrambling for TDD HS-SCCH", 3GPP TSG-RAN WG1 Meeting #26, Tdoc R1-02-0739, Gyeongju, Korea, May 13-16, 2002.
Siemens, "UE Specific Masking for HS-SCCH", TSG-RAN WG1 Meeting #26, R1-02-0783, Gyeongju, Korea, May 13-16, 2002.
Siemens, "UE Specific Masking for HS-SCCH," TSG RAN WG1 Meeting #24, R1-02-0482, Orlando, Florida, Feb. 18-22, 2002.
Siemens, "Changes to 25.212 for HSDPA work item"; 3GPP TSG RAN WG1 Meeting #24, Orlando, USA, Feb. 18-22, 2002, R1-02-0492.
Siemens, "Discussion on channel coding schemes for the physical downlink shared control channel (HS-SCCH)", TSG-RAN Working Group 1 meeting #22, Nov. 19-23, 2001, Jeju, Korea, R1-01-1131.
Siemens, "Rate Matching and Channel Coding for HS-SCCH", 3GPP TSG-RAN1, Meeting #25, Paris, France, Apr. 9-12, 2002, R1-02-0605.
Siemens, "Structure of the downlink shared control channel for HSDPA", TSG-RAN Working Group 1 Ad Hoc meeting on HSDPA, R1-01-1030, Nov. 5-7, 2001, Sophia-Antipolis, France.
Supplemental Expert Report of Dr. Apostolos K. Kakaes Regarding Invalidity and Non-Infringement of U.S. Pat. No. 6,973,579, (Jun. 2, 2008).
Texas Instruments, "HS-SCCH: Performance results and improved structure", R1-02-0637, 3GPP TSG RAN WG1 Meeting #25, Paris, France, Apr. 9-12, 2002.
Texas Instruments, "HS-SCCH: Performance Results and Improved Structure," 3GPP TSG RAN WG1 Meeting #25, R1-02- 0535, Paris, France, Apr. 9-12, 2002.
TIA/EIA Interim Standard "Mobile Station-Base Station Compatibility for Dual-Mode Wideband Spread Spectrum Cellular System", TIA/EIA/IS-9-5A, (May 1995).

TR 25.858, v1.0.4, 3GPP TSG RAN #23, Jan. 8-11, 2002, Espoo, Finland, R1-02-0199.
U.S. Appl. No. 60/024,133, filed Aug. 19, 1996, Hoffstein et al.
U.S. Appl. No. 60/070,762, filed Jan. 8, 1998, Peter I. Vasiliev.
U.S. Appl. No. 60/138,713, filed Jun. 11, 1999, Anand G. Dabak.
U.S. Appl. No. 60/098,089, filed Aug. 27, 1998, Chris Heegard.
U.S. Appl. No. 60/141,178, filed Jun. 25, 1999, Joakim Persson.
U.S. Appl. No. 60/208,642, filed Jun. 1, 2000, Risling Micha.
U.S. Appl. No. 60/378,509, filed May 7, 2002, Shin et al.
U.S. Appl. No. 60/290,740, filed May 14, 2001, Terry et al.
U.S. Appl. No. 60/338,330, filed Dec. 7, 2001, Hoffstein et al.
Das et al., "Design and Performance of Down Link Shared Control Channel for HSDPA," The 13th IEEE International Symposium on Personal, Indoor and Mobile Radio Communications, vol. 3, pp. 1088-1091 (Sep. 15-18, 2002).
Nokia Corporation and Nokia Inc.'s Response to the Amended Complaint and Amended Notice of Investigation, In the Matter of Certain Wireless Devices with 3G Capabilities and Components Thereof, Investigation No. 337-TA-800, Jan. 27, 2012.
Nokia Corporation and Nokia Inc.'s Response to the Complaint and Notice of Investigation, In the Matter of Certain Wireless Devices with 3G Capabilities and Components Thereof, Investigation No. 337-TA-800, Sep. 27, 2011.
Response of Respondent Futurewei to Complaint Under Section 337 of the Tariff Act of 1930, as Amended, and Notice of Investigation, In the Matter of Certain Wireless Devices with 3G Capabilities and Components Thereof, Investigation No. 337-TA-800, Sep. 27, 2011.
Response of Respondent Huawei to Amended Complaint Under Section 337 of the Tariff Act of 1930, as Amended, and Amended Notice of Investigation, In the Matter of Certain Wireless Devices with 3G Capabilities and Components Thereof, Investigation No. 337-TA-800, Jan. 27, 2012.
Response of Respondent Huawei to Complaint Under Section 337 of the Tariff Act of 1930, as Amended, and Notice of Investigation, In the Matter of Certain Wireless Devices with 3G Capabilities and Components Thereof, Investigation No. 337-TA-800, Sep. 27, 2011.
Response of ZTE Corporation and ZTE (USA) to the Amended Complaint of Interdigital Communications, LLC, Interdigital Technology Corp., and IPR Licensing, Inc. under Section 337 of the Tariff Act of 1930, as Amended, and Notice of Investigation, In the Matter of Certain Wireless Devices with 3G Capabilities and Components Thereof, Investigation No. 337-TA-800, Jan. 27, 2012.
Supplemental Response of Respondent Futurewei to Complaint Under Section 337 of the Tariff Act of 1930, as Amended, and Notice of Investigation, In the Matter of Certain Wireless Devices with 3G Capabilities and Components Thereof, Investigation No. 337-TA-800, Jan. 12, 2012.
Public Version of Initial Determination, In the Matter of Certain Wireless Devices with 3G Capabilities and Components Thereof, Investigation No. 337-TA-800, Jun. 28, 2013.
Public Version of Commission Opinion, In the Matter of Certain Wireless Devices with 3G Capabilities and Components Thereof, Investigation No. 337-TA-800, Feb. 19, 2014.
Third Generation Partnership Project, "Technical Specification Group Radio Acces Network; Multiplexing and channel coding (FDD) (Release 1999)," 3GPP TS 25.212 V3.9.0 (Mar. 2002).
3GPP TR 25.848 V4.0.0 (Mar. 2001) 3rd Generation Partnership Project; Technical Specification Group Radio Access Network; Physical Layer aspects of UTRA High Speed Downlink Packet Access (Release 4) (Mar. 2001).
3GPP TR 25.855 V5.0.0 (Sep. 2001) 3rd Generation Partnership Project; Technical Specification Group Radio Access Network; High Speed Downlink Packet Access; Overall UTRAN Description (Release 5) (Sep. 2001).
3GPP TR 25.890 V1.0.0 (May 2002) 3rd Generation Partnership Project; Technical Specification Group Radio Access Network; High Speed Downlink Packet Access: UE Radio Transmission and Reception (FDD) (Release 5) (May 2002).
3GPP TR 25.950 V4.0.0 (Mar. 2001) 3rd Generation Partnership Project; Technical Specification Group Radio Access Network; UTRA High Speed Downlink Packet Access (Release 4) (Mar. 2001).

(56) References Cited

OTHER PUBLICATIONS

3GPP TSG RAN WG1#24, HI and Shared Control Channel performance issues, Tdoc R1-02-0352, Orlando, USA, Feb. 18-22, 2002, Philips.
3rd Generation Partnership Project; "Technical Specification Group Radio Access Network; MAC protocol specification; (Release 5)," 3GPP TS 25.321 V5.0.0 (Mar. 2002).
The Patent Reexamination Board of the State Intellectual Property Office of the People's Republic of China, "Decision of Invalidation Request," Chinese Patent No. ZL03810259.5, May 30, 2012.
The Patent Reexamination Board of the State Intellectual Property Office of the People's Republic of China, "Decision of Invalidation Request," Chinese Patent No. ZL03244389.7, May 29, 2012.
IPWireless, "Removal of quantisation of βj gain factor when calculated from a reference TFC," Tdoc R1-02- 0340, 3GPP TSG-RAN WG1 Meeting #24, Orlando, USA, Feb. 18-22, 2002.
IPWireless, "Corrections to TS25.223," Tdoc R1-02-0094, 3GPP TSG-RAN WG1 Meeting #23, Espoo, Finland, Jan. 8-11, 2002.
Samsung, "UE Specific CRC & Tail bit for HS-SCCH," Tdoc R1-02-0390, 3GPP TSG-RAN WG1 #24, Orlando, Florida, Feb. 18-22, 2002.
Philips, "Unblocking HS-SCCH conflicts," Tdoc R1-02-0353, 3GPP TSG RAN WG1#24, Orlando, USA, Feb. 18-22, 2002.
Samsung, "Serving HS-SCCH set reconfiguration signalling (MAC-hs signalling)," R1-02-0426, 3GPP TSG-RAN WG1 meeting #24, Orlando, Florida, Feb. 18-22, 2002.
Ericsson, "Coding for channel-quality-related information," R1-01-1144, 3GPP TSG-RAN1 #22, Cheju, Korea, Nov. 19-23, 2001.
Lucent Technologies, "Considerations on HI and HS-SCCH," R1-02-0324, 3GPP TSG-RAN WG1#24, Orlando, FL, USA, Feb. 18-21, 2002.
Lucent Technologies, "Fast (MAC-hs) Signalling in HSDPA," R1-02-0323, 3GPP TSG-RAN WG1#24, Orlando, FL, USA, Feb. 18-21, 2002.
Nokia, "Adding section on HS-SCCH/HS-PDSCH timing relation," Tdoc R1-02-0621, 3GPP TSG-RAN WG1 Meeting 125, Paris, France, Apr. 9-12, 2002.
Nokia, "Adding section on HS-SCCH/HS-PDSCH timing relation," Tdoc R1-02-0700, 3GPP TSG-RAN WG1 Meeting 126, Gyeongju, Korea, May 13-16, 2002.
3rd Generation Partnership Project, "Draft Minutes for TSG RAN WG1 #25 meeting," TSG-RAN Working Group 1 meeting No. 25, TSGR-1-02-0688, Paris, France, Apr. 9-12, 2002.
3rd Generation Partnership Project, "Revised minutes for 3GPP TSG-RAN WG1 24th meeting," TSGR1-02-0575, TSG-RAN Working Group 1 meeting No. 25, Paris, France, Apr. 9-12, 2002.
Lucent Technologies, "Robustness of Transmit Diversity on HS-SCCH," R1-02-0698, 3GPP TSG-RAN WG1#26, Gyeongju, Korea, May 13-16, 2003.
RP-01-0823, TR 25.858 v 1.0.0, 3GPP TSG RAN#14, Dec. 11-14, 2001, Kyoto, Japan.
3rd Generation Partnership Project, "Technical Specification Group Radio Access Network Multiplexing and channel coding (FDD) (Release 1999)," 3GPP TS 25.212 v3.11.0, Sep. 2002.
3rd Generation Partnership Project, "Technical Specification Group Radio Access Network, Multiplexing and channel coding (FDD) (Release 5)," 3GPP TS 25.212 v5.10.0, Jun. 2005.
3rd Generation Partnership Project, "Technical Specification Group Radio Access Network, Multiplexing and channel coding (FDD) (Release 6)," 3GPP TS 25.212 v6.10.0 (Dec. 2006).
3rd Generation Partnership Project, "Technical Specification Group Radio Access Network, Physical channels and mapping of transport channels onto physical channels (FDD) (release 5)," 3GPP TS 25.211 v5.0.0, Mar. 2002.
3rd Generation Partnership Project, "Technical Specification Group Radio Access Network, Physical channels and mapping of transport channels onto physical channels (FDD) (Release 5)," 3GPP TS 25.211 v5.8.0, Dec. 2005.

3rd Generation Partnership Project, "Technical Specification Group Radio Access Network, Physical channels and mapping of transport channels onto physical channels (FDD) (Release 6)," 3GPP TS 25.211 v6.9.0, Dec. 2007.
3rd Generation Partnership Project, "Technical Specification Group Radio Access Network, Physical layer procedures (FDD) (Release 5)," 3GPP TS 25.214 v5.11.0, Jun. 2005.
3rd Generation Partnership Project, "Technical Specification Group Radio Access Network; Spreading and modulation (FDD) (Release 5)," 3GPP TS 25.213 v5.0.0, Mar. 2002.
3rd Generation Partnership Project, "Technical Specification Group Radio Access Network; Multiplexing and channel coding (TDD) (Release 5)," 3GPP TS 25.222 V5.0.0 (Mar. 2002).
3rd Generation Partnership Project, "Technical Specification Group Radio Access Network; Physical Layer Procedures (FDD) (Release 5)," 3GPP TS 25.214 v5.0.0, Mar. 2002, 2010.
Abdulaziz et al., "Embedding Data in Images Using Turbo Coding," pp. 88-92.
Abdulaziz, et al., "Coding Techniques for Data Hiding Images," *International Symposium on Signal Processing and its Applications (ISSPA)*, pp. 170-173, Kuala Lumpur, Malaysia Aug. 13-16, 2001 (IEEE).
Alam, "Simulation of Third Generation CDMA Systems," Thesis submitted to Virginia Polytechnic Institute and State Univ., Dec. 15, 1999.
Altera, "Implementing a W-CDMA System with Altera Devices & IP Functions," Altera Application Note 129, Sep. 2000.
Bahl et al., "Rate 1/2 Convolutional Codes With Complementary Generators," *IEEE Transactions on.Information Theory*, vol. IT-17, No. 6, p. 718-727 (Nov. 1971).
Bai et al., "Downlink Performance of Randomized OFDM Access" (2001).
Bailey et al., "Project: IEEE P802.15 Working Group for Wireless Personal Area Networks (WPANs)," doc:.: 802.15-02/106r0, NTRU, Feb. 2002.
Bellamy, *Digital Telephony*, 3rd Edition, John Wiley & Sons, 2000.
Benedetto et al., "Design of Parallel Concatenated Convolutional Codes," *IEEE Transactions on Communications*, vol. 44, No. 5, pp. 591-600 (IEEE May 1996).
Bossert et al., "Generalized Concatenation of Encoded Tamed Frequency Modulation," *IEEE Transaction on Communications*, vol. 46, No. 10, pp. 1337-1345 (IEEE Oct. 1998).
Brouwer et al., "An Updated Table of Minimum-Distance Bounds for Binary Linear Codes," *IEEE Transactions on Information Theory*, vol. 39, No. 2, Mar. 1993.
Brown, "Encryption Scales to Fit Smaller RF Tags," *Electronic Engineering Times*, Apr. 8, 2002.
Buchanan, *Advanced Data Communication and Networks*, Chapman & Hall, 1997.
Cain et al, "Punctured Convolutional Codes of Rate (n-1)/n. And Simplified Maximum Likelihood Decoding," *IEEE Transactions on Information Theory*, vol. IT-25, No. 1 (IEEE Jan. 1979).
Chambers, "On Convolutional Codes of Rate 1/n For Spread-Spectrum Communications," The Institution of Electrical Engineers (IEEE 1993).
Chambers, "On Good Convolutional Codes of Rate 1/2, 1/3, and 1/4," *Singapore ICCS/ISITA '92*, p. 750-754, (IEEE 1992).
Chase, "Code Combining—A Maximum-Likelihood Decoding Approach for Combining an Arbitrary Number of Noisy Packets," *IEEE Transactions on Communications*, vol. 33, No. 5, (IEEE May 1985).
Costello, et al., "Applications of Error-Control Coding," *IEEE Transactions on Information Theory*, vol.44, No. 6, 1998, 1995.
Dale et al., "Channel Coding for Asynchronous Fiberoptic CDMA Communications," p. 376.
Dale et al., "Channel Coding for Asynchronous Fiberoptic CDMA Communications," *IEEE Transactions on Communications*, vol. 43, No. 9 (IEEE Sep. 1995).
Dholakia, *Introduction to Convolutional Codes with Applications*, Kluwer Academic Publishers (1994).
Einarsson, "Coding for a Multiple-Access Frequency-Hopping System" *IEEE Transactions on Communications*, vol. 32, No. 5, (IEEE May 1984).

(56) References Cited

OTHER PUBLICATIONS

Esmaeili et al., "A Link Between Quasi-Cyclic Codes and Convolutional Codes," *IEEE Transactions on Information Theory*, vol. 44, No. 1, Jan. 1998 (IEEE), 1999.
Falahati et al., "Future Improvements to Wideband CDMA.", 1998.
Falahati et al., "Hybrid Type-II ARQ Schemes for Rayleigh Fading Channels."
Fazel et al., *Multi-Carrier Spread-Spectrum & Related Topics*, 3rd ed., Kluwer Academic Publishers (2002).
Forney, "The Viterbi Algorithm," *Proceedings of the IEEE*, vol. 61, No. 3 (Mar. 1973).
Fragouli et al., "Turbo-Encoder Design for Symbol-Interleaved Parallel Concatenated Trellis-Coded Modulation," IEEE Transactions on Communications, vol. 49, No. 3, pp. 425-435 (March 2001).
Fragouli et al., "Turbo-Encoder Design for Symbol-Interleaved Parallel Concatenated Trellis-Coded Modulation," Electrical Engineering Department, University of California, Los Angeles, 1999.
Frenger et al., "Code-Spread CDMA using Low-Rate Convolutional Codes," p. 374-378 (1998).
Frenger, et al., "Code-Spread CDMA Using Maximum Free Distance Low-Rate Convolutional Codes," *IEEE Transactions on Communications*, vol. 48, No. 1 (IEEE Jan. 2000).
Frenger et al., "Convolutional Codes with Optimum Distance Spectrum," *IEEE Communications Letters*, vol. 3, No. 11 (Nov. 1999).
Frenger et al., "Multi-rate Convolutional Codes," Technical Report No. 21, Chalmers Univ. of Technology, Apr. 1998.
Frenger et al., "Rate Matching in Multichannel Systems Using RCPC-Codes," p. 354-357 (IEEE 1997).
Frenger et al., "Rate-Compatible Convolutional Codes for Multirate DS-CDMA Systems " *IEEE Transactions on Communications*, vol. 47, No. 6, p. 828-836 (IEEE Jun. 1999).
Frenger et al., "zRate-Compatible Convolutional Codes for Multirate DS-CDMA Systems," *IEEE Transactions on Communications*, vol. 47, No. 6, pp. 828-836 (IEEE Jun. 1999).
Gentry et al., "Cryptanalysis of the Revised NTRU Signature Scheme."
Gentry et al., "Cryptanalysis of the NTRU Signature Scheme (NSS) from Eurocrypt 2001," 2001.
Gentry, "Key Recovery and Message Attacks on NTRU-Composite," Eurocrypt 2001.
Ghosh et al., "Control Channel Design for High Speed Downlink Shared Channel for 3GPP W-CDMA, Rel-5," 2085-2089 (IEEE 2003).
Hagenauer et al., "The Performance of Rate-Compatible Punctured Convolutional Codes for Digital Mobile Radio," *IEEE Transactions on Communications*, vol. 38, No. 7, p. 966-980 (IEEE Jul. 1990).
Hagenauer, "Rate Compatible Punctured Convolutional Codes (RCPC Codes) and their Applications," *IEEE Transactions on Communications*, vol. 36, No. 4 p. 389-400 (Apr. 1988).
Heller et al., "Viterbi Decoding For Satellite and Space Communication," *IEEE Transactions on Communication Technology*, vol. COM-19, No. 5 (Oct. 1971).
Hoffstein et al., "NSS: The NTRU Signature Scheme," NTRU Cryptosystems, Inc., Burlington MA, 2006.
Hoffstein et al., "NTRU: A Ring-Based Public Key Cryptosystem."
Hui, "Throughput Analysis for Code Division Multiple Accessing of the Spread Spectrum Channel " *IEEE Journal on Selected Areas in Communications*, vol. SAC-2, No. 4, p. 482-486 (IEEE Jul. 1984).
Hui, "Throughput Analysis for Code Division Multiple Accessing of the Spread Spectrum Channel " *IEEE Transactions on Vehicular Technology*, vol. VT-33, No. 3, p. 98-102 (IEEE Aug. 1984).
Interdigital, "TDD MAC Layer Subchannel Assignment," Tdoc R1-02-0501, Change Request 25.224 CR 084 Current Version 3.9.0, 3GPP TSG-RAN1 Meeting #24, Orlando, Florida, USA, Feb. 18-22, 2002.
Interdigital, "TDD MAC Layer Subchannel Assignment," Tdoc R1-02-0501, Change Request 25.224 CR 084 Current Version 4.3.0, 3GPP TSG-RAN1 Meeting #24, Orlando, Florida, USA, Feb. 18-22, 2002.
Interdigital, "TDD MAC Layer Subchannel Assignment,"Tdoc R1-02-0284, Change Request 25.224 CR 084 Current Version 3.9.0, 3GPP TSG-RAN1 Meeting #24, Orlando, Florida, USA, Feb. 18-22, 2002.
Interdigital, "TDD MAC Layer Subchannel Assignment,"Tdoc R1-02-0284, Change Request 25.224 CR 084 Current Version 4.3.0, 3GPP TSG-RAN1 Meeting #24, Orlando, Florida, USA, Feb. 18-22, 2002.
Johannesson et al., *Fundamentals of Convolutional Coding*, Institute of Electrical and Electronics.Engineers, Inc. (1999).
Juntti et al., "Performance of Convolutionally Coded Chip Combiner and Signal Level Based Erasure DS Receivers in Pulsed Noise Interface," *MILCOM '91*, pp. 262-266 (IEEE 1991).
Jush, "A Block Coding Scheme for CDMA Digital Radio Communication Systems Based on Terminated Convolutional Codes," *IEEE 47th Vehicular Technology Conference*, vol. 2, p. 1243-1247, (IEEE 1997).
Kim et al., "Turbo-Coded Optical Direct-Detection CDMA System with PPM Modulation " *Journal of Lightwave Technology*, vol. 19, No. 3, Mar. 2001, pp. 312-323.
Kunisa, "Runlength Control Based on Guided Scrambling for Digital Magnetic Recording," *IEICE Trans. Electron.*, vol. E82-C., No. 12, Dec. 1999, pp. 2209-2217.
Kunisa, "Runlength Violation of Weakly Constrained Code," *IEEE Transactions on Communications*, vol. 50, No. 1, pp. 1-6 (IEEE Jan. 2002).
Larsen, "Short Convolutional Codes with Maximal Free Distance for Rates 1/2, 1/3, and 1/4 " *IEEE Transactions on Information Theory*, p. 371-372 (IEEE May 1973).
Lee, "New Short Constraint Length, Rate 1/N Convolutional Codes Which Minimize the Required SNR for Given Desired Bit Error Rates," *IEEE Transactions on Communications*, vol. COM-33, No. 2, p. 171-177 (IEEE Feb. 1985).
Lee et al., *Scrambling Techniques for CDMA Communications*, Kluwer Academic Publishers (2001).
Lefrancois et al., "Search Procedures for Very Low Rate Quasi-Optimal Convolutional Codes," *Proceedings of the IEEE International Symposium on Information Theory*, Trondheim, Norway Jun. 27-Jul. 1, 1994 (IEEE 1994).
Lefrancois et al., "Very Low Rate Quasi-Optimal Convolutional Codes for CDMA," Ecole Polytechnique de Montreal, Department of Electrical and Computer Engineering, 210-213, 1994.
Levy et al., *An algebraic approach to constructing convolutional codes from quasi-cyclic codes*, DIMACS Series in Discrete Mathematics and Theoretical Computer Science, Coding and Quantization, vol. 14, at 189-198, Oct. 1992.
LG Electronics, Inc., "Uplink QI signaling with error-detection capability," Tdoc R1-01-1135, TSG-RAN Working Group 1 #22, Jeju, Korea, Nov. 19-23, 2001.
Lucent Technologies, "Performance of Transmit Diversity Schemes on the HS-SCCH," R1-02-0647, 3GPP TSG RAN WG1 meeting #25, Paris, France, Apr. 9-12, 2002.
Ma et al., "On Tail Biting Convolutional Codes," *IEEE Transactions on Communications*, vol. COM-34, No. 2, p. 104-111 (Feb. 1986).
Mackay, *Information Theory, Inference and Learning Algorithms*, Version 7.2, Cambridge University Press (2003).
MacWilliams et al., *The Theory of Error-Correcting Codes*, North-Holland Publishing Company (1977).
Malkamaki, "Performance of Error Control Over Block Fading Channels with ARQ Applications," Helsinki University of Technology, Communications laboratory, Technical Report T43, Espoo (Oct. 23, 1998).
Masselos et al., "Reconfigurability requirements of wireless communication systems," INTRACOM SA, Development Programmes Department, Peania, Attika, Greece, 2VTT Electronics, 2003.
Maxey et al., "Optimisation of Orthogonal Low-Rate Convolutional Codes in a DS-CDMA System," (IEEE 1995).

(56) References Cited

OTHER PUBLICATIONS

May, "Cryptoanalysis of NTRU," Dept. of Computer Science, University of Frankfurt.
McEliece, "The Theory of Information and Coding: A Mathematical Framework for Communication," *Encyclopedia of Mathematics and its Applications*, vol. 3, (1977).
Motorola et al., "Modified Proposal for HS-SCCH," R1-02-0414, TSG RAN WG1 meeting #24, Orlando, Florida U.S.A, Feb. 18-22, 2002.
Motorola, "HSDPA performance w/wo HI bit," R1-02-0287, TSG RAN WG1 meeting #24, Feb. 18-22, 2002, Orlando, USA.
Motorola, "HSDPA performance w/wo STTD when the HS-SCCH and Associated DCH are explicitly modeled," R1-02-0612, TSG RAN WG1 meeting #25, Paris, France, Apr. 8-12, 2002.
Motorola, "HSDPA performance w/wo closed-loop transmit diversity when the HS-SCCH and Associated DCH are explicitly modeled," R1-02-0614, TSG RAN WG1 meeting #25, Paris, France, Apr. 8-12, 2002.
Muhonen, "Compatibility of DOD Satellite Communications Standards with International Civil Standards," p. 153-159, (IEEE 1997).
Nortel Networks, "Power offset for layer 1 signalling of HS-SCCH code set," R1-020449, TSG-RAN Working Group1 meeting #24 Orlando, FL, USA Feb. 18-22, 2002.
Nortel Networks, "Way forward on HI," R1-020332, TSG-RAN Working Group1 meeting #24, Orlando, FL, USA Feb. 18-22, 2002.
NTRU, "NTRU announces GenuID; First Complete Security Solution Designed Specifically for Radio Frequency Identification and Contactless Applications," Mar. 18, 2002.
Ormondroyd et al., "A High Performance CDMA Cellular Radio System Based on Low-Rate Convolutional Coding," *Radio Receivers and Associated Systems*, Conference Publication No. 415, Sep. 26-28, 1995 (IEEE).
O'Rourke, "Efficient NTRU Implementations," Thesis, Worcester Polytechnic Institute, Apr. 2002.
Ottosson et al., "On Schemes for Multirate Support in DS-CDMA Systems," *Wireless Personal Communications*, Kluwer Academic Publishers, 1998.
Philips, "Performance Requirements for Channel Quality Signalling," TSGR1(01)1204, TSG RAN WG1 #22, Jeju, South Korea, Nov. 19-23, 2001.
Prasad et al., *Third Generation Mobile Communication Systems*, Artech House, pp. 144-145 (2000).
Proakis, *Digital Communications*, 4th Edition, McGraw Hill (2001).
*Proceedings of Symposia in Applied Mathematics: Different Aspects of Coding Theory*, edited by Robert Calderbank, American Mathematical Society, Jan. 2-3, 1995.
Ramirez et al., "Sequential and Viterbi decoding performance employed in CDMA for satellite communications," SPIE vol. 1691, pp. 140-151 (1992).
Rauschmayer, *ADSL/VDSL Principles, A Practical and Precise Study of Asymmetric Digital Subscriber Lines and Very High Speed Digital Subscriber Lines*, MacMillan Technology Series, 1999.
Ray, "Convolutional Codes from 'Optimal' Linear Block Codes," pp. 853-857, (IEEE 1997).
Risteski, "Joint Despreading and Iterative Decoding in DS-CDMA System with Serially Concatenated Turbo Code and Walsh Code," pp. 378-382 (IEEE 2000).
Robertson et al., "A System Design for a Wireless Home Multi-Media LAN," Multimedia Applications, Services and Techniques—ECMAST '98, Third European Conference, Berlin, Germany, May 26-28, 1998 Proceedings (Springer), pp. 453-466.
Scanlon, "Public Key Cryptosystems Based on Drinfeld Modules are Insecure," Aug. 7, 1999, revised Aug. 7, 2000.
Schneier, "Data Guardians," Macworld, Feb. 1993.
Schneier, *Applied Cryptography: Protocols, Algorithms, and Source Code in C*, 2nd Edition, John Wiley & Sons, 1996.
Siala et al., "Block and Trellis Codes for the Binary (1-D) Partial Response Channel with Simple Maximum Likelihood Decoders," *IEEE Transactions on Communications*, vol. 44, No. 12 (IEEE Dec. 1996).
Sklar, *Digital Communications: Fundamentals and Applications*, Prentice Hall (1988).
Solomon, "A Connection Between Block and Convolutional Codes, Society for Industrial and Applied Mathematics," *Society for Industrial and Applied Mathematics Journal of Applied Mathematics*, vol. 37, No. 2 (Oct. 1979).
Starr et al., *Understanding Digital Subscriber Line Technology*, Communication Engineering and Emerging Technologies, p. 285-295, Prentice Hall (1999).
Sweeney, *Error Control Coding: From Theory to Practice*, John Wiley & Sons (2002).
Tanner, "Convolutional Codes from Quasi-Cyclic Codes: A Link Between the Theories of Block and Convolutional Codes," Baskin Center for Computer Engineering & Information Sciences, University of California, Santa Cruz, CA, Nov. 1987.
The GenuID system manufactured, sold, offered for sale, or publicly used by NTRU Cryptosystems (now Security Innovations) by at least Mar. 18, 2002.
TIA/EIA Interim Standard: "Mobile Station-Base Station Compatibility Standard for Dual-Mode Wideband Spread Spectrum Cellular System," TIA/EIA/IS-95 (Jul. 1993).
Turner, "Convolutional Codes from Quasi-Cyclic Codes: A Link Between the Theories of Block and Convolutional Codes," U.C. Santa Cruz, Nov. 1987.
Viterbi, "Error Bounds for Convolutional Codes and an Asymptotically Optimum Decoding Algorithm," *IEEE Transactions on Information Theory*, vol. IT-13, No. 2, p. 260-269 (IEEE 1967).
Viterbi, "Very Low Rate Convolutional Codes for Maximum Theoretical Performance of Spread-Spectrum Multiple-Access Channels," *IEEE Journal on Selected Areas in Communications*, vol. 8, No. 4 (May 1990).
Wade, *Signal Coding and Processing*, 2nd Ed., Cambridge Univ. Press (1994).
Wicker, *Error Control Systems for Digital Communication and Storage*, Prentice Hall (1995).
Wu et al., "Iterative Multiuser Detection for Convolutionally Encoded CDMA with Differential Modulation," pp. 886-890 (IEEE 2002).
Wyant, "Establishing Security Requirements for DRM Enabled Systems," NTRU Communications and Content Security, W3C DRM Workshop, Jan. 23, 2001.
Xia et al., Near-Optimal Convolutionally Coded Asynchronous CDMA with Iterative Multiuser Detection/Decoding pp. 1521-1525 (IEEE 2002).
Yasuda et al., "Development of Variable-Rate Viterbi Decoder and its Performance Characteristics," *Sixth International Conference on Digital Satellite Communications*, XII-24-XII-27 (Sep. 1983).
Yasuda et al., "High-Rate Punctured Convolutional Codes for Soft Decision, Viterbi Decoding," *IEEE Transactions on Communications*, vol. COM-32, No. 3 (IEEE Mar. 1984).
Ziemer et al., *Digital Communications and Spread Spectrum Systems*, Chapter 12, Collier MacMillan (1985).
Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).
Third Generation Partnership Project, "Technical Specification Group Radio Access Network; Physical channels and mapping of transport channels onto physical channels (FDD) (Release 1999)," 3GPP TS 25.211 V3.11.0 (Jun. 2002).
Third Generation Partnership Project, "Technical Specification Group Radio Access Network; Physical channels and mapping of transport channels onto physical channels (FDD) (Release 4)," 3GPP TS 25.211 V4.4.0 (Mar. 2002).
Third Generation Partnership Project, "Technical Specification Group Radio Access Network; Physical channels and mapping of transport channels onto physical channels (FDD) (Release 4)," 3GPP TS 25.211 V4.5.0 (Jun. 2002).

(56) References Cited

OTHER PUBLICATIONS

Third Generation Partnership Project, "Technical Specification Group Radio Access Network; Physical channels and mapping of transport channels onto physical channels (FDD) (Release 5)," 3GPP TS 25.211 V5.1.0 (Jun. 2002).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Spreading and modulation (FDD) (Release 1999)," 3GPP TS 25.213 V3.7.0 (Dec. 2001).
Third Generation Partnership Project, "Technical Specification Group Radio Access Network; Spreading and modulation (FDD) (Release 1999)," 3GPP TS 25.213 V3.8.0 (Jun. 2002).
Third Generation Partnership Project, "Technical Specification Group Radio Access Network; Spreading and modulation (FDD) (Release 4)," 3G TS 25.213 V4.2.0 (Dec. 2001).
Third Generation Partnership Project, "Technical Specification Group Radio Access Network; Spreading and modulation (FDd) (Release 4)," 3G TS 25.213 V4.3.0 (Jun. 2002).
Third Generation Partnership Project, "Technical Specification Group Radio Access Network; Spreading and modulation (FDD) (Release 5)," 3G TS 25.213 V5.0.0 (Mar. 2002).
Third Generation Partnership Project, "Technical Specification Group Radio Access Network; Spreading and modulation (FDD) (Release 5)," 3GPP TS 25.213 V5.1.0 (Jun. 2002).
Third Generation Partnership Project, "Technical Specification Group Radio Access Network; Physical layer procedures (FDD) (Release 1999)," 3GPP TS 25.214 V3.10.0 (Mar. 2002).
Third Generation Partnership Project, "Technical Specification Group Radio Access Network; Physical layer procedures (FDD) (Release 4)," 3GPP TS 25.214 V4.4.0 (Mar. 2002).
Third Generation Partnership Project, "Technical Specification Group Radio Access Network; Physical layer procedures (FDD) (Release 5)," 3GPP TS 25.214 V5.1.0 (Jun. 2002).
Third Generation Partnership Project, "Technical Specification Group Radio Access Network; Physical layer procedures (FDD) (Release 5)," 3GPP TS 25.214 V5.11.0 (Jun. 2005).
Ericsson, "HS-DSCH-related downlink signaling," 3GPP TSG-RAN1 #23, Espoo, Finland, R1-02-0077 (Jan. 8-11, 2002).
Lathi, "Modem Digital and Analog Communication Systems," Holt, Rinehart and Winston, pp. 660-688 (1983).
Nokia, "DSCH Data Rate in UE Capabilities, " 3GPP TSG RAN WG1#10, Beijing, China, Meeting No. 10, Tdoc R1-00-0112 (Jan. 18-21, 2000).
Roman, "Introduction to Coding and Information Theory," Springer, pp. 234-237, 240, 245 (1997).
Siemens AG, "Improved Rate Matching Scheme for Convolutional Codes," AH27, Radio Link Performance Enhancements, 3GPP TSG RAN WG1#13, Tdoc R1-00-649, Tokyo, Japan (May 22-May 25, 2000).
Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).
Third Generation Partnership Project, "Technical Specification Group Services and System Aspects; QoS Concept and Architecture (Release 1999)," 3GPP TS 23.107 V3.8.0 (Mar. 2002).
Third Generation Partnership Project, "Technical Specification Group Services and System Aspects; QoS Concept and Architecture (Release 4)," 3GPP TS 23.107 V.4.4.0 (Mar. 2002).
Third Generation Partnership Project, "Technical Specification Group Services and System Aspects; QoS Concept and Architecture (Release 5)," 3GPP TS 23.107 V5.4.0 (Mar. 2002).
Third Generation Partnership Project, "Technical Specification Group Services and System Aspects; QoS Concept and Architecture (Release 5)," 3GPP TS 23.107 V5.5.0 (Jun. 2002).
Third Generation Partnership Project, "Technical Specification Group Radio Access Network; Multiplexing and channel coding (FDD) (Release 1999)," 3GPP TS 25.212 V3.10.0 (Jun. 2002).
Third Generation Partnership Project, "Technical Specification Group Radio Access Network; Multiplexing and channel coding (FDD) (Release 4)," 3GPP TS 25.212 V4.4.0 (Mar. 2002).
Third Generation Partnership Project, "Technical Specification Group Radio Access Network; Multiplexing and channel coding (FDD) (Release 4)," 3GPP TS 25.212 V4.5.0 (Jun. 2002).
Third Generation Partnership Project, "Technical Specification Group Radio Access Network; Multiplexing and channel coding (TDD) (Release 1999)," 3GPP TS 25.222 V3.8.0 (Mar. 2002).
Third Generation Partnership Project, "Technical Specification Group Radio Access Network; Multiplexing and channel coding (TDD) (Release 1999)," 3GPP TS 25.222 V3.9.0 (Jun. 2002).
Third Generation Partnership Project, "Technical Specification Group Radio Access Network; Multiplexing and channel coding (TDD) (Release 4)," 3GPP TS 25.222 V4.3.0 (Mar. 2002).
Third Generation Partnership Project, "Technical Specification Group Radio Access Network; Multiplexing and channel coding (TDD) (Release 4)," 3GPP Ts 25.222 V4.4.0 (Jun. 2002).
Third Generation Partnership Project, "Technical Specification Group Radio Access Network; Multiplexing and channel coding (TDD) (Release 5)," 3GPP TS 25.222 V5.1.0 (Jun. 2002).
Third Generation Partnership Project, "Technical Specification Group Radio Access Network; MAC protocol specification (Release 1999)," 3GPP TS 25.321 V3.11.0 (Mar. 2002).
Third Generation Partnership Project, "Technical Specification Group Radio Access Network; MAC protocol specification (Release 1999)," 3GPP TS 25.321 V3.12.0 (Jun. 2002).
Third Generation Partnership Project, "Technical Specification Group Radio Access Network; MAC protocol specification (Release 4)," 3GPP TS 25.321 V4.4.0 (Mar. 2002).
Third Generation Partnership Project, "Technical Specification Group Radio Access Network; MAC protocol specification (Release 4)," 3GPP TS 25.321 V4.5.0 (Jun. 2002).
Third Generation Partnership Project, "Technical Specification Group Radio Access Network; MAC protocol specification (Release 5)," 3GPP TS 25.321 V5.1.0 (Jun. 2002).
Holma et al., "Wcdma For UMTS—Radio Access for Third Generation Mobile Communications," First Edition, (2000).
Holma et al., "Wcdma For UMTS—Radio Access for Third Generation Mobile Communications," Revised Edition, (2001).
NEC, "Physical channel mapping for HS-DPCCH," 3GPP TSG-RAN WG1 Meeting #27, R1-02-0962 (Jul. 2002).
The Patent Reexamination Board of the State Intellectual Property Office of the People's Republic of China, "Decision of Invalidation Request," Chinese Patent No. ZL200710123140.8, Dec. 31, 2015.
The Patent Reexamination Board of the State Intellectual Property Office of the People's Republic of China, "Decision of Invalidation Request," Chinese Patent No. ZL200710123141.2, Jan. 6, 2016.
TSG RAN WG1, "Bit scrambling for HS-DSCH," 3GPP TSG RAN Meeting #17, R1-02-0995 (Jun. 2002).
TSG RAN WG1, "HARQ bit collection," 3GPP TSG RAN Meeting #17, R1-02-0963 (Jul. 2002).

USER EQUIPMENT IDENTIFICATION SPECIFIC SCRAMBLING

CROSS REFERENCE TO RELATED APPLICATIONS

This application is a continuation of U.S. patent application Ser. No. 12/467,694 filed May 18, 2009, which issued as U.S. Pat. No. 7,970,127 on Jun. 28, 2011; which is a continuation of U.S. patent application Ser. No. 11/796,534 filed Apr. 24, 2007 [sic], which issued as U.S. Pat. No. 7,536,013 on May 19, 2009; which is a continuation of U.S. patent application Ser. No. 10/779,431, filed Feb. 13, 2004, which issued as U.S. Pat. No. 7,349,540 on Mar. 25, 2008; which is a continuation of U.S. patent application Ser. No. 10/187,640, filed Jul. 1, 2002, which issued as U.S. Pat. No. 6,973,579 on Dec. 6, 2005, which claims priority from U.S. Provisional Application No. 60/378,170, filed May 13, 2002, and U.S. Provisional Application No. 60/378,509, filed May 7, 2002, which are incorporated by reference as if fully set forth.

BACKGROUND

The present invention relates to wireless communication systems. More particularly, the present invention relates to user equipment identification specific scrambling sequences for high speed shared control channels (HS-SCCH).

A high speed downlink packet access (HSDPA) is proposed for wideband code division multiple access communication systems. HSDPA allows for high downlink data rates to support multimedia services.

To support HSDPA, high speed shared control channels (HS-SCCHs) are used. The HS-SCCHs are used to signal vital control information to the user equipments (UEs). Each HS-SCCH has two parts, referred to as Part-1 and Part-2. Part-1 carries time critical information needed by the UE. This information includes the channelization code set and the modulation type used by the high speed physical downlink shared control channel (HS-PDSCH) which carries the HSDPA payload. This information is vital to support HSDPA, since HSDPA uses adaptive modulation and coding (AMC).

To obtain its Part-1 information, each HSDPA UE monitors up to four HS-SCCHs for its information. The information for a particular UE is distinguished from other UEs by its UE identification (UE ID) specific scrambling sequence. The UE processes each monitored HS-SCCH with its UE ID specific scrambling sequence to detect the HS-SCCH intended for the UE. After processing, the UE determines on which HS-SCCH, if any, information was carried using its scrambling sequence. The UE descrambles the data carried on Part-1 of its HS-SCCH using its scrambling sequence.

Until recently, a 10 bit UE ID was used as the basis for the UE ID specific scrambling sequence. In this case, this UE ID was converted into a 40 bit scrambling sequence. To turn the 10 bit UE ID into the 40 bit UE ID specific scrambling sequence, the 10 bit UE ID is processed by a Reed-Muller block to produce a 32 bit code. The first 8 bits of the produced code are repeated and appended onto the back of the 32 bit code to produce a 40 bit code.

Although it is proposed to extend the UE ID length to 16 chips, the current proposal for the HS-SCCHs uses a 10 bit UE ID. This UE ID is converted into a 40 bit scrambling sequence. To turn the 10 bit UE ID into the 40 bit scrambling sequence, the 10 bit UE ID is processed by a Reed-Muller block to produce a 32 bit code. The first 8 bits of the produced code are repeated and appended onto the back of the 32 bit code to produce a 40 bit code.

To reduce the occurrence of false detections, it is desirable to have good separation between the produced scrambling codes for each UE ID. Accordingly, it is desirable to have alternate approaches to producing scrambling codes.

SUMMARY

A base station for use in a code division multiple access communication system comprises circuitry configured to process a user equipment identification (UE ID) by 1/2 rate convolutionally encoding the UE ID to produce a sequence. The sequence is used by the base station for scrambling a high speed shared control channel (HS-SCCH). The base station is configured to transmit a wireless signal. The wireless signal provides the user equipment with payload data carried on a high speed physical downlink shared channel (HS-PDSCH). The HS-PDSCH is associated with the HS-SCCH.

DETAILED DESCRIPTION OF THE PREFERRED EMBODIMENTS

Figure 1A:
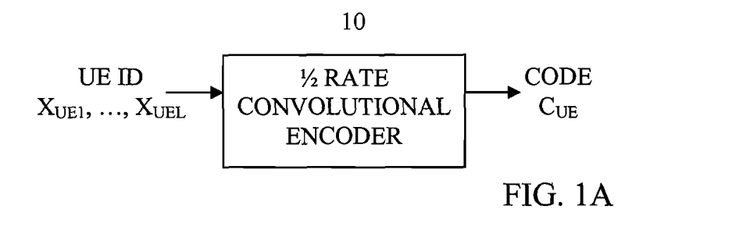
FIG. 1A is a preferred diagram of a circuit for producing a code associated with a particular user for a HS-SCCH.
Figure 1B:
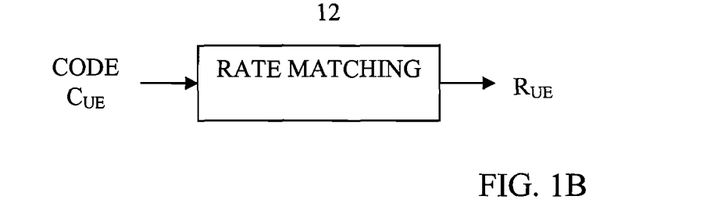
FIG. 1B is a diagram of a rate matching block used in conjunction with FIG. 1A.

Although the preferred embodiments are described in conjunction with the preferred application of the invention for use with the HSDPA of the third generation partnership project (3GPP) wideband code division multiple access (W-CDMA) communication system, the invention can be applied to other code division multiple access communication systems. FIGS. 1A and 1B are diagrams of a preferred UE ID specific scrambling sequence circuit. A UE ID, $X_{UE}$, of length L is input into the circuit. L can be any length, such as 8 bits, 10 bits, 16 bits, etc. The UE ID, $X_{UE} = \{X_{UE1}, \ldots, X_{UEL}\}$, is input into a 1/2 rate convolutional encoder 10 as shown in FIG. 1A. Along with the UE ID, extra bits, such as zeros, may be added to the end of the input string to extend the length of the input string and, accordingly, the output string. The use of a 1/2 rate convolutional encoder 10 provides for a high level of code separation between the output strings produced by different UE IDs. Additionally, current proposed 3GPP W-CDMA communication systems utilize a 1/2 rate convolutional encoder 10 for a forward error correction (FEC) technique. Accordingly, no additional hardware is required to generate the convolutionally encoded UE ID specific scrambling sequence. After encoding, based on the length of the output string, a rate matching stage 12 may be added to puncture bits to obtain a desired string length.

Figure 2A:
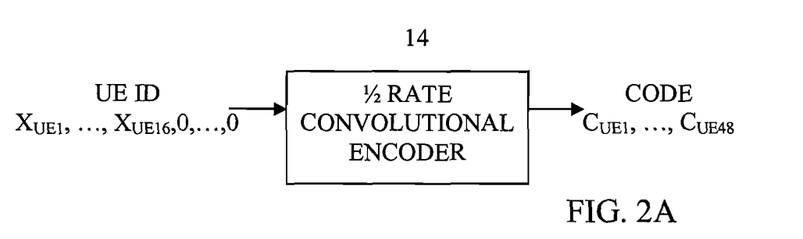
FIG. 2A is a preferred diagram of a circuit for producing a code associated with a user identification of 16 bits.
Figure 2B:
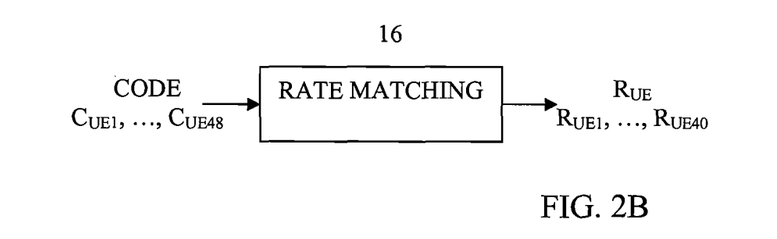
FIG. 2B is a diagram of a rate matching block used in conjunction with FIG. 2A.

FIGS. 2A and 2B are diagrams of preferred UE ID specific scrambling sequence circuit for preferred UE ID codes of length 16, L=16. The 16 bit UE ID, $X_{UE}$={$X_{UE}1, \ldots, X_{UE16}$}, is input into a 1/2 rate convolutional encoder 14 along with eight zero bits appended onto the end of the input string. As a result, the input string is $X_{UE1}, \ldots, X_{UE16}, 0, 0, 0, 0, 0, 0, 0, 0$. After being processed by the 1/2 rate convolutional encoder 14, the output code is 48 bits in length, $C_{UE}$={$C_{UE1}, \ldots, C_{UE48}$}.

To reduce the length of the code to a preferred length of 40 bits, eight bits are preferably punctured. FIG. 2B illustrates the rate matching stage 16 to perform the puncturing. After the rate matching stage 16, the effective length of the scrambling code is 40 bits.

Figure 4:
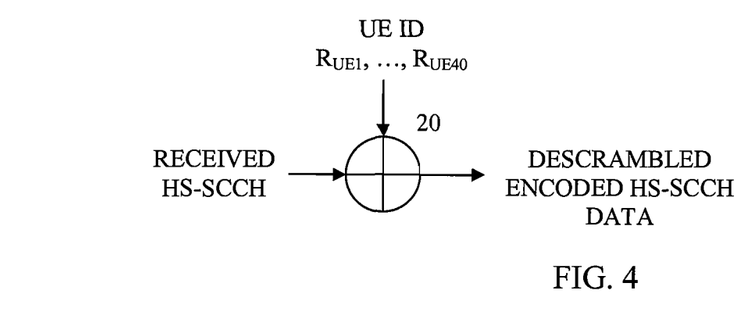
FIG. 4 is a simplified base station using the UE ID specific scrambling code.

FIG. 4 is a simplified diagram of a user equipment descrambling a HS-SCCH using the UE ID specific scrambling code. The UE ID scrambling code is mixed, such as by exclusive-or gate 18, with the received HS-SCCH for use in recovering the encoded HS-SCCH data.

Figure 3:
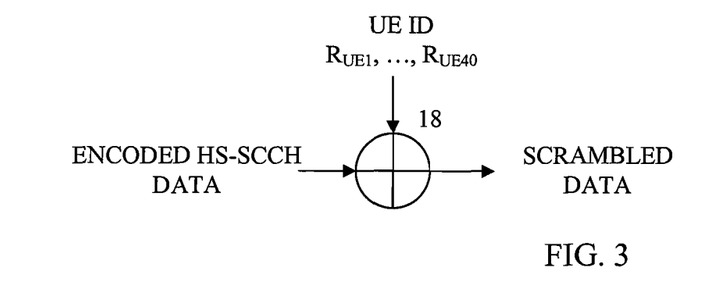
FIG. 3 is a simplified user equipment using the UE ID specific scrambling code.

FIG. 3 is a simplified diagram of a base station scrambling encoded data with the UE ID specific scrambling code for transfer over the HS-SCCH. The encoded data is mixed with the UE ID scrambling code, such as by an exclusive-or gate 20, for a particular user. The scrambled data is used to produce the HS-SCCH for transfer to the particular user.

What is claimed is:

1. A wideband code division multiple access (WCDMA) base station (BS) comprising:
   circuitry configured to transmit bits over a high speed shared control channel (HS-SCCH) wherein the bits are a result of a combining of control information and a user specific scrambling sequence associated with a user equipment (UE), the user specific scrambling sequence being a result of a 1/2 rate convolutional encoding of a UE identification (ID) associated with the UE; and
   circuitry configured to transmit payload data to the UE over a high speed physical downlink shared channel (HS-PDSCH) associated with the HS-SCCH.

2. The WCDMA BS of claim 1 wherein the control information includes channelization and modulation information of the HS-PDSCH.

3. The WCDMA BS of claim 1 wherein the user specific scrambling sequence is a result of rate matching of the 1/2 rate convolutional encoded UE ID.

4. A wideband code division multiple access (WCDMA) system comprising:
   a base station (BS) comprising:
      circuitry configured to transmit bits over a high speed shared control channel (HS-SCCH) wherein the bits are a result of a combining of control information and a user specific scrambling sequence associated with a user equipment (UE), the user specific scrambling sequence being a result of a 1/2 rate convolutional encoding of a UE identification (ID) associated with the UE; and
      circuitry configured to transmit payload data to the UE over a high speed physical downlink shared channel (HS-PDSCH) associated with the HS-SCCH; and
   the UE comprising:
      circuitry configured to process the HS-SCCH; and
      circuitry configured to recover the payload data from the PDSCH associated with the HS-SCCH in response to the HS-SCCH including the bits.

5. The WCDMA system of claim 4 wherein the control information includes channelization and modulation information of the HS-PDSCH.

6. The WCDMA system of claim 4 wherein the user specific scrambling sequence is a result of rate matching of the 1/2 rate convolutional encoded UE ID.

7. A wideband code division multiple access (WCDMA) base station (BS) comprising:
   circuitry configured to transmit control information over a high speed shared control channel (HS-SCCH) wherein the control information is processed with a user specific scrambling sequence associated with a user equipment (UE), the user specific scrambling sequence being a result of a 1/2 rate convolutional encoding of a UE identification (ID) associated with the UE; and
   circuitry configured to transmit a high speed physical downlink shared channel (HS-PDSCH) associated with the HS-SCCH.

8. The WCDMA BS of claim 7 wherein the control information includes channelization and modulation information of the HS-PDSCH.

9. The WCDMA BS of claim 7 wherein the user specific scrambling sequence is a result of rate matching of the 1/2 rate convolutional encoded UE ID.

10. A wideband code division multiple access (WCDMA) system comprising:
    a base station (BS) comprising:
       circuitry configured to transmit control information over a high speed shared control channel (HS-SCCH) wherein the control information is processed with a user specific scrambling sequence associated with a user equipment (UE), the user specific scrambling sequence being a result of a 1/2 rate convolutional encoding of a UE identification (ID) associated with the UE; and
       circuitry configured to transmit a high speed physical downlink shared channel (HS-PDSCH) associated with the HS-SCCH; and
    the UE comprising:
       circuitry configured to process the HS-SCCH; and
       circuitry configured to process the HS-PDSCH in response to the HS-SCCH including the control information processed with the user specific scrambling sequence associated with the UE.

11. The WCDMA system of claim 10 wherein the control information includes channelization and modulation information of the HS-PDSCH.

12. The WCDMA system of claim 10 wherein the user specific scrambling sequence is a result of rate matching of the 1/2 rate convolutional encoded UE ID.

* * * * *